United States Patent [19]

Okamoto et al.

[11] Patent Number: 4,704,640

[45] Date of Patent: Nov. 3, 1987

[54] METHOD AND APPARATUS FOR RECORDING PCM SIGNAL

[75] Inventors: Hiroo Okamoto; Masaharu Kobayashi, both of Yokohama, Japan

[73] Assignee: Hitachi, Ltd., Tokyo, Japan

[21] Appl. No.: 787,447

[22] Filed: Oct. 15, 1985

[30] Foreign Application Priority Data

Oct. 17, 1984 [JP] Japan ................... 59-216122

[51] Int. Cl.$^4$ .......................... G11B 5/00; G11B 5/09; H03M 13/00

[52] U.S. Cl. ........................ 360/32; 360/48; 371/39

[58] Field of Search ............. 360/32, 48; 369/59; 371/2, 39, 40

[56] References Cited

U.S. PATENT DOCUMENTS 4,143,406 3/1979 Tsuiki et al. ............ 360/48
4,224,642 9/1980 Mawatani et al. ........ 360/32

Primary Examiner—Vincent P. Canney
Attorney, Agent, or Firm—Antonelli, Terry & Wands

[57] ABSTRACT

In PCM signal recording method and apparatus using rotary heads for converting two channels of autio PCM signals each consisting of 12-bit words to a data consisting of 8-bit words and recording the converted data, there is provided means for converting the PCM signals to two data each consisting of eight high order bits of each of two words of the PCM signals, and an 8-bit data consisting of the remaining four low order bits of the respective words. The converted PCM data are recorded on a record tape in a format such that PCM signals having i words/channel which are to be recorded on first and second tracks are divided into a first half and a second half, even data in the first half and odd data in the second half constitute the data to be recorded on the first track, and odd data in the first half and even data in the second half constitute the data to be recorded on the second track.

7 Claims, 10 Drawing Figures

12 TO 8 BIT DATA CONVERSION CIRCUIT 22

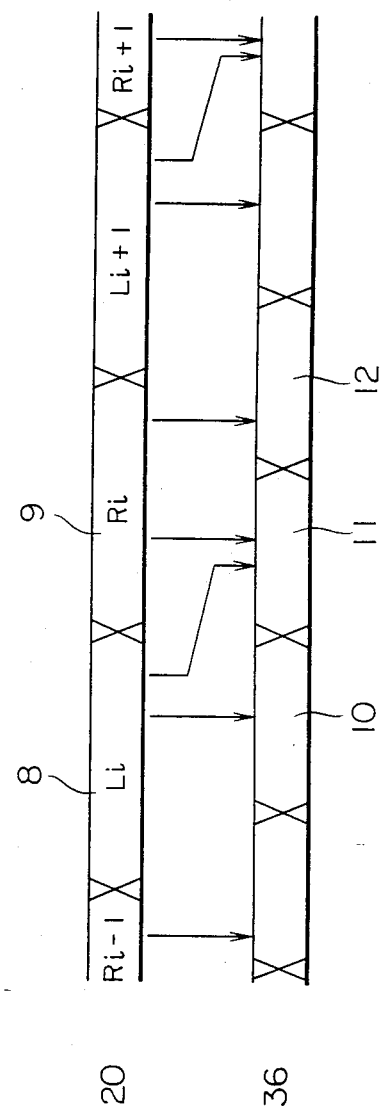

| FIG. 9A-1 | FIG. 9A-2 |

| 75 | 76 | 77 | 78 | 79 | 80 | 81 | | 126 | 127 |
|---|---|---|---|---|---|---|---|---|---|
| | R1u | R833u | R3u | R835u | R5u | R837u | | R51u | R883u |
| | R53u | R885u | | | | | | | |
| | R1l | | | | | | | | |
| | R53l | | | | | | | | |
| | R105u | R937u | R107u | R939u | R109u | R941u | | R155u | R967u |
| | R157u | R989u | | | | | | | |
| | R209u | R1041u | R211u | R1043u | R213u | R1045u | | R259u | R1091u |
| | R261u | R1093u | | | | | | | |
| Q | R313u | R1145u | R315u | R1147u | R317u | R1149u | | R363u | R1195u |
| | R365u | R1197u | | | | | | | |
| | R417u | R1249u | R419u | R1251u | R421u | R1253u | | R467u | R1299u |
| | R469u | R1301u | | | | | | | |
| | R521u | R1353u | R523u | R1355u | R525u | R1357u | | R571u | R1403u |
| | R573u | R1405u | | | | | | | |
| | R625u | P0 | R627u | | R629u | | | R675u | |
| | R677u | | | | | | | | |
| | | P1 | | P | | P | | | P |
| | R729u | P2 | R731u | | R733u | | | R779u | |
| | R781u | | | | | | | | |
| | | P3 | | | | | | | |

32 SYMBOLS

FIG. 9A-1

INTERLEAVE FORMAT
TRACK (+azimuth)

BLOCK ADDRESS →

| 0 | 1 | 2 | 3 | 4 | 5 | 50 | 51 | 52 |
|---|---|---|---|---|---|---|---|---|
| L 0u | L832u | L 2u | L634u | L 4u | L236u | L 50 | L882u | |
| L52u L0ℓ L52ℓ | L884u | L 54u | L886u | L 56u | L888u | L102u | L934u | |
| L104u | L936u | L106u | L938u | L108u | L940u | L154u | L786u | |
| L156u | L988u | L158u | L990u | L160u | L792u | L206u | L1038u | |
| L208u | L1040u | L210u | L1042u | L212u | L1044u | L258u | L1090u | |
| L260u | L1092u | L262u | L1094u | L264u | L1096u | L310u | L1142u | |
| L312u | L1144u | L314u | L1146u | L316u | L1148u | L362u | L1194u | Q Q Q |
| L364u | L1196u | L366u | L1198u | L368u | L1200u | L414u | L1246u | |
| L416u | L1248u | L418u | L1250u | L420u | L1252u | L466u | L1218u | |
| L468u | L1300u | L470u | L1302u | L472u | L1304u | L518u | L1350u | |
| L520u | L1352u | L522u | L1354u | L524u | L1356u | L570u | L1402u | |
| L572u | L1404u | L574u | L1406u | L576u | L1408u | L622u | | |
| | | | | | | | L1402ℓ | |
| L624u L676u | P0 | L626u L678u | | L628u L680u | | L674u L726u | | |
| | P1 | | | | | | | |
| L728u | P2 | L730u | P | L732u | P | L778u | P | P |
| L780u | | L782u | | L784u | | L830u | | |
| | P3 | | | | | | | |

RECORDING DIRECTION ↓

| FIG. 9B-1 | FIG 9B-2 |

| 75 | 76 | 77 | 78 | 79 | 80 | 81 | ... | 126 | 127 |
|---|---|---|---|---|---|---|---|---|---|
| | L1u<br>L53u<br>L1ℓ<br>L53ℓ | L833u<br>L885u | L3u | L835u | L5u | L837u | | L57u | L883u |
| | L105u<br>L157u | L937u<br>L989u | L107u | L939u | L109u | L941u | | L155u | L989u |
| | L209u<br>L261u | L1041u<br>L1093u | L211u | L1043u | L213u | L1045u | | L259u | L1091u |
| | L313u<br>L365u | L1145u<br>L1197u | L315u | L1147u | L317u | L1149u | | L363u | L1195u |
| | L417u<br>L469u | L1249u<br>L1301u | L419u | L1251u | L421u | L1252u | | L467u | L1279u |
| | L521u<br>L573u | L1353u<br>L1405u | L523u | L1355u | L525u | L1357u | | L571u | L1403u |
| | | | | | | | | | L1403ℓ |
| | L625u<br>L677u<br>L729u<br>L781u | P0<br>P1<br>P2<br>P3 | L627u<br>L731u | P | L629u<br>L733u | P | | L675u<br>L779u | P |

FIG. 9B-1

| TRACK (-azimuth) | | | | | | | BLOCK ADDRESS | | |
|---|---|---|---|---|---|---|---|---|---|
| 0 | 1 | 2 | 3 | 4 | 5 | | 50 | 51 | 52 |
| R 0 u<br>R 52 u<br>R 0 ℓ<br>R 52 ℓ | R832u<br>R884u | R 2u<br>R54u | R834u<br>R886u | R 4 u<br>R 56 u | R836u<br>R888u | | R50u<br>R102u | R882u<br>R934u | |
| R104u<br>R156u | R936u<br>R788u | R106u<br>R158u | R938u<br>R790u | R108u<br>R160u | R940u<br>R792u | | R154u<br>R206u | R786u<br>R1038u | |
| R208u<br>R260u | R1040u<br>R1092u | R210u<br>R262u | R1042u<br>R1094u | R212u<br>R264u | R1044u<br>R1096u | | R258u<br>R310u | R1090u<br>R1192u | |
| R312u<br>R364u | R1144u<br>R1196u | R314u<br>R366u | R1146u<br>R1198u | R316u<br>R368u | R1148u<br>R1200u | | R362u<br>R414u | R1194u<br>R1246u | Q Q Q |
| R416u<br>R468u | R1248u<br>R1300u | R418u<br>R470u | R1250u<br>R1302u | R420u<br>R472u | R1252u<br>R1304u | | R466u<br>R518u | R1298u<br>R1350u | |
| R520u<br>R572u | R1352u<br>R1404u | R522u<br>R574u | R1354u<br>R1406u | R524u<br>R576u | R1356u<br>R1408u | | R570u<br>R622u | R1402u<br>////<br>R1402ℓ<br>//// | |
| R624u<br>R676u<br><br>R728u<br>R780u | P0<br>P1<br>P2<br>P3 | R626u<br>R678u<br><br>R730u<br>R782u | P | R628u<br>R680u<br><br>R732u<br>R784u | P | | R674u<br>R726u<br><br>R778u<br>R830u | P | P |

RECORDING DIRECTION ↓

METHOD AND APPARATUS FOR RECORDING PCM SIGNAL

BACKGROUND OF THE INVENTION

The present invention relates to a PCM signal recording technique, and more particularly to method and apparatus for recording a PCM signal suitable for a rotary-head type PCM recorder.

In the PCM recorder, as disclosed in Japanese unexamined patent publication No. 58-173934 laid open on Oct. 12, 1983 (Japanese patent application No. 57-55660 filed on Apr. 3, 1982), a PCM signal (1 word) having a sampling frequency of 48 KHz or 44.1 KHz and the number of quantization bits of 16 is recorded by eight bits. (The eight bits are called one symbol). In the rotary head type PCM recorder for recording the PCM signal on a magnetic tape by the rotary head, the data sequence is recorded so that original PCM signals may be reconstructed in each track as disclosed in Japanese unexamined patent publication No. 58-188314 laid open on Nov. 2, 1983 (Japanese patent application No. 57-69915 filed on Apr. 26, 1982).

On the other hand, long time recording in which a recording time of the PCM signal to the recording medium is approximately two times as long as that of conventional recording may be attained by setting a sampling frequency of the signal to be recorded such as an audio signal to 32 KHz and non-linearly quantizing the signal by 12 bits. However, since one word consists of 12 bits, the conventional method of recording the signal by symbol cannot be used.

A technical trend of rotary-head type digital audio tape recorder (R-DAT) is described in "DAT Meeting Activity" on pages 36–42, particularly pages 40–42 of ELECTRONICS, vol. 24, No. 10, 1984 published by EIAJ (Electronics Industries Association of Japan).

SUMMARY OF THE INVENTION

It is an object of the present invention to provide method and apparatus for converting an input PCM signal having each word thereof comprised of a predetermined number of bits adaptively to a PCM signal recording scheme in which the word signal is recorded by a predetermined number of bits smaller than the number of bits of one word, as units of data processing.

It is another object of the present invention to provide a PCM signal recording method suitable for a rotary-head type PCM recorder, in which the PCM signal having 12-bit words is converted to 8-bit data so that it is applicable to a system in which the signal is processed in units of 8 bits, with the same error concealment capability as that attained when a PCM signal having 16-bit words is recorded.

In accordance with one feature of the present invention, two words of PCM signals are converted to three symbols of data, including symbols each consisting of high order bits of each word, and a symbol consisting of low order bits of the respective words, and adjacent PCM signals are arranged as ODD data and EVEN data distant from each other on different tracks to facilitate processing of signals by 8 bits or by symbol and to compensate for a burst error encountered in reproduction.

In accordance with another feature of the present invention, two channels of sampled PCM signals are converted to 3-symbol data and recorded on a record medium by a plurality of rotary heads. A predetermined number of symbols of data which can be recorded on alternate tracks on the record medium are grouped into two groups corresponding to a first half and a second half of the PCM signals in the time sequence, and even symbol data corresponding to even PCM signals of the first half of the PCM signals and odd symbol data corresponding to odd PCM signals of the second half are recorded on one of the alternate tracks, and odd symbol data for odd PCM signals of the first half and even symbol data for even PCM signals of the second half are recorded on the other track, and the data terminates in units of alternate (pair) tracks. On the other hand, an error detection/correction code terminates in each track. In the first half and the second half of each track, the even symbol data and the odd symbol data of the PCM signals are arranged in this sequence or in the opposite sequence.

In accordance with the present invention, the PCM signal having 12-bit words can be converted to an 8-bit signal by simple processing so that the signal can be applicable to the system in which the signal is processed by 8 bits. If one track of burst error or a burst error on a plurality of tracks up to one half of the track occurs, it does not appear as a burst error in the time sequence in reproduction and the error concealment capability is improved.

BRIEF DESCRIPTION OF THE DRAWINGS

FIG. 8 shows a timing chart of the data conversion circuit, and FIGS. 9A (consisting of FIGS. 9A-1 and 9A-2) and 9B (consisting of FIGS. 9B-1 and 9B-2 show data record formats corresponding to FIGS. 1 and 2, respectively, when words need not be converted.

DESCRIPTION OF THE PREFERRED EMBODIMENTS

One embodiment of the present invention is described with reference to FIGS. 1 and 2.

Figure 1:
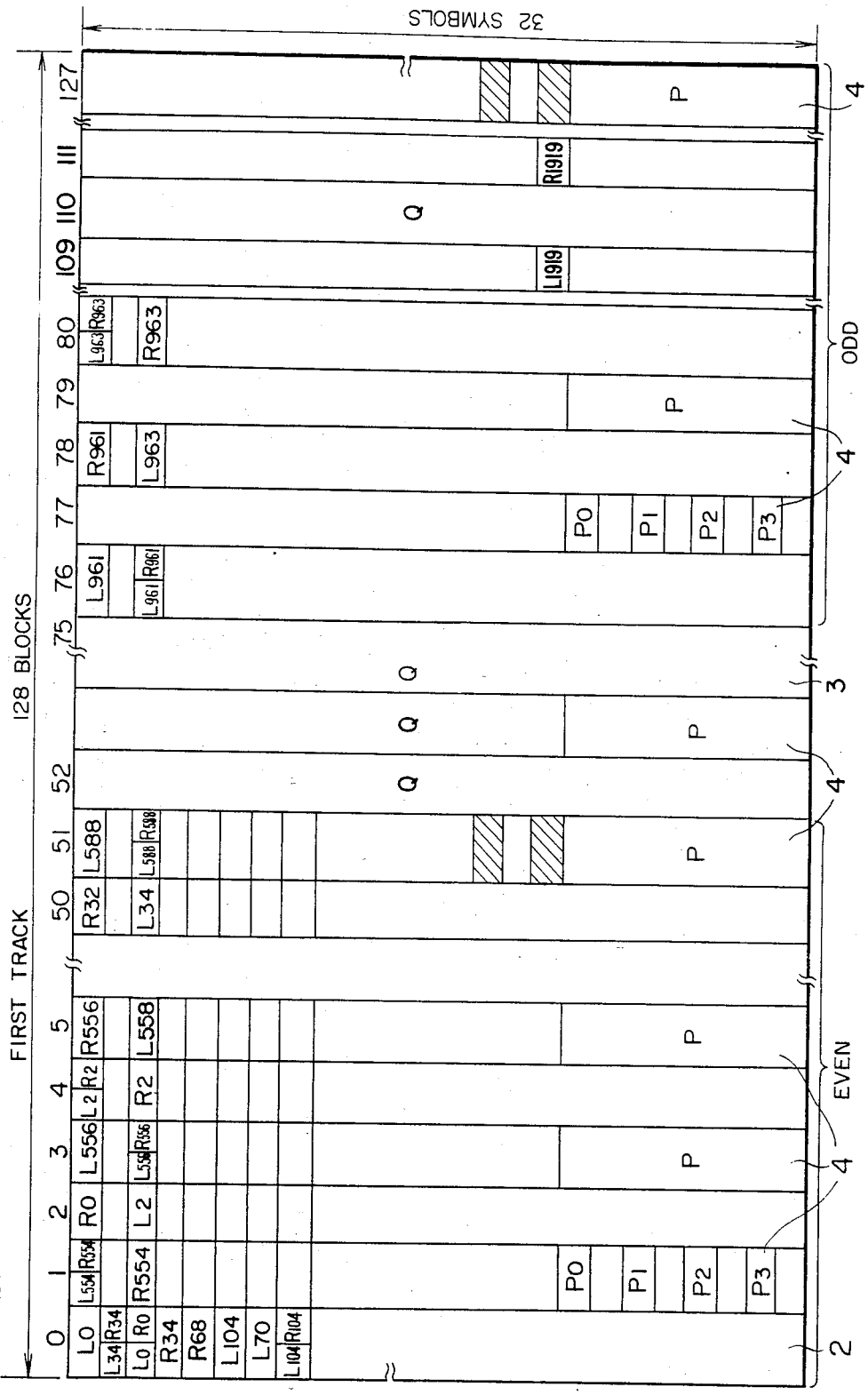
FIG. 1 shows a data format on a first track in one embodiment of the present invention.
Figure 2:
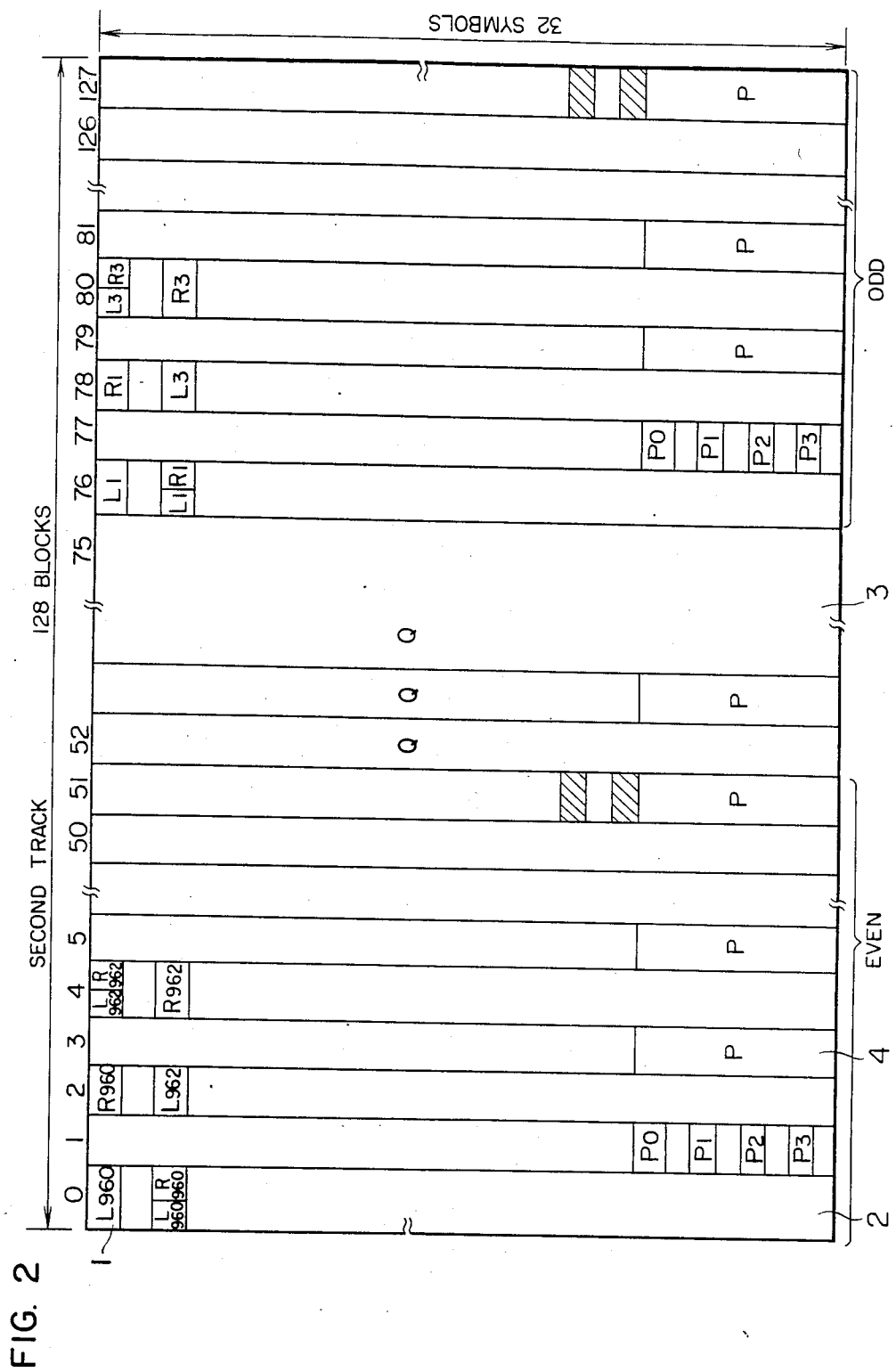
FIG. 2 shows a data format on a second track.

FIGS. 1 and 2 shows data formats in the present invention. Two channels of PCM signal having 12-bit words are arranged in two tracks. FIG. 1 shows the data format on the first track, and FIG. 2 shows the data format on the second track. Numeral 1 denotes one symbol which consists of 8 bits and numeral 2 denotes one block. Usually, one-word signal comprises two symbols, an upper symbol and a lower symbol. One block comprises 32 symbols and 128 blocks are recorded on one track. Numeral 3 denotes a first error detection and correction code Q and numeral 4 denotes a second error detection and correction code P.

When the sampling frequency is 32 KHz (for 1 word=12 bits) and rotating speed of the rotary head is 1000 rpm, the number of data per revolution is 1920 words/channel. Since two recording heads are mounted on a cylinder, two tracks are recorded in one revolution. Accordingly, 1920 words/channel of data must be arranged on two tracks.

The two channels of the PCM signal are represented for the sake of convenience, by left and right channel signals L and R. The data formats on the first and second tracks, of the two channels of the PCM signal having 16-bit words are shown in FIGS. 9A and 9B. The detail is disclosed in U.S. patent application Ser. No. 712,094 (European patent application No. 85103110.4 filed Mar. 18, 1985) entitled "Rotary Head Type PCM Recording and Reproduction Method and System" by Hiroaki Takahashi, Masaharu Kobayashi, Takaharu Noguchi, Toshifumi Shibuya and Takao Arai on Mar. 15, 985 based on Japanese patent application No. 54-50915 filed on Mar. 19, 1984, and assigned to the present assignee, the disclosure of which is incorporated herein by reference.

In FIG. 1, the L channel of the PCM signal is represented by $L_0$–$L_{1919}$ and the R channel of the PCM signal is represented by $R_0$–$R_{1919}$. Numerals indicate the order on the time sequence. Hatched areas are vacant areas.

In the two L and R channels of the PCM signal having 12-bit words, two words (24 bits) of the L channel data and two words of the R channel data in the same order are converted to 3-symbol data. 8 bits of the 12-bit Li constitute one symbol, 8 bits of 12-bit Ri constitute one symbol, and the remaining 4 bits of the 12-bits Li and the remaining 4 bits of the 12-bit Ri constitute one symbol. Of the three 8-bit data thus converted, the L and R odd data and the L and R even data relative to L and R PCM signals are arranged at spaced locations on different tracks. As shown in FIG. 1, for the 0th–959th 3-symbol data, the even data are arranged in a first half of a first track and the odd data are arranged in a second half of a second track. As shown in FIG. 2, for 960th–1919th data, the even data is arranged in a first half of the second track and the odd data is arranged in a second half of the first track. By this arrangement, even if one track of burst error or a burst error on two tracks up to one half of the track takes place, a burst error does not appear on the time sequence in reproduction.

In each region, that is, the first half or the second half of each track, data is arranged such that two consecutive symbols are arranged at close positions in the same block. For example, in the first half of the first track, the first symbol $L_0$ and the second symbol $L_0/R_0$ are arranged at the first and third positions in the first block, the third symbol $R_0$ and the fourth symbol $L_2$ are arranged at the first and third positions in the third block, and so on. Since the data in one word of the L channel and one word of the R channel are included in consecutive symbols, the error concealment capability is not affected even if errors occur in both symbols. The symbols of associated words are arranged at alternate positions in the block so that they may be contained in a second error detection/correction code sequence to be described later.

The data thus arranged has the first error detection/correction code (parity symbol Q) 3 and the second error detection/correction code (parity symbol P) 4 added thereto so that errors can be detected and corrected during the reproduction. To add the error detection/correction codes, the first error detection/correction code 3 is first added, then the second error detection/correction code 4 is added. The first error detection/correction code (Q) 3 is added to the same symbol number of every four blocks (e.g. first symbol of 0th, 4th, 8th—blocks) and it may be a Reed-Solomon code having a code length of 32 symbols and a minimum distance of 7. The second error detection/correction code (P) 4 is added to odd and even symbols of every two blocks and it may be a Reed-Solomon code having a code length of 32 symbols and a minimum distance of 5.

Figure 3:
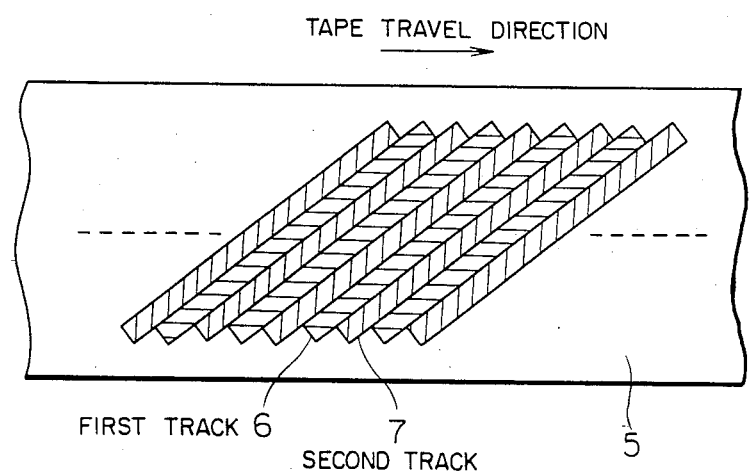
FIG. 3 shows a track arrangement on a magnetic tape.

FIG. 3 shows a track arrangement on a magnetic tape. Numeral 5 denotes the magnetic tape and numerals 6 and 7 denote first and second tracks scanned by the pair of rotary heads. The data is scattered in the two adjacent tracks, as shown in FIG. 1.

Figure 4:
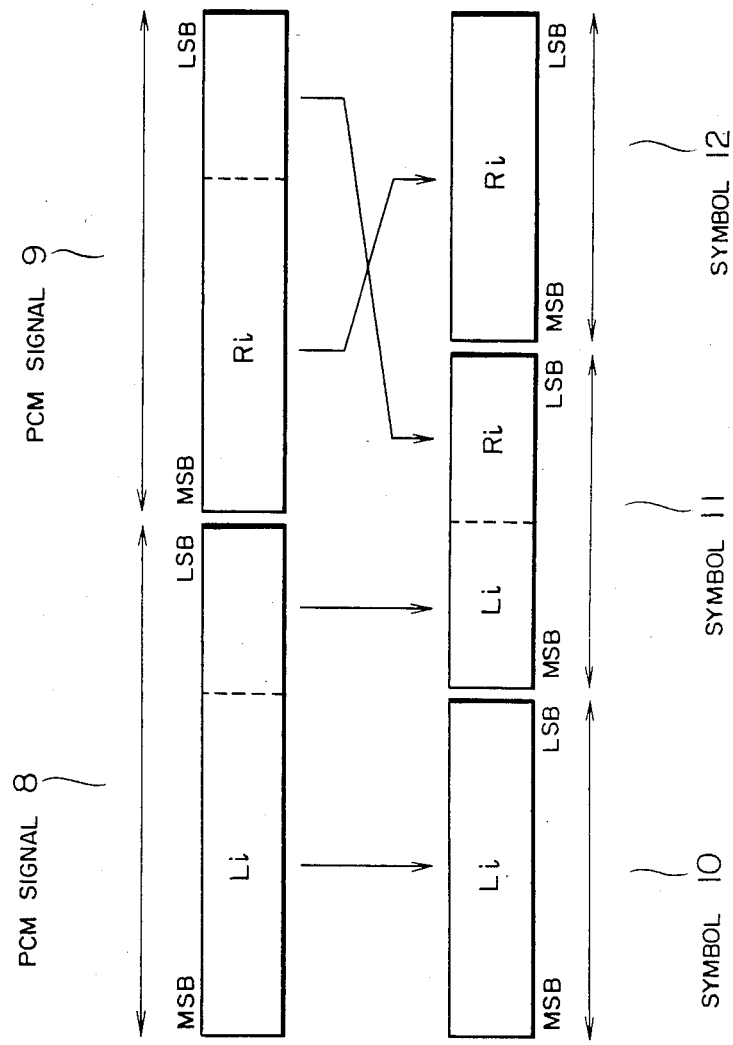
FIG. 4 illustrates a data conversion method.

FIG. 4 shows a method for converting the 12-bit PCM signal to the 8-bit symbols. As described above, the 12-bit data 8 of the L channel and the 12-bit data 9 of the R channel in the same order are converted to 3-symbol (8- bits/symbol) data 10–12. The symbol 10 consists of 8 high order bits of the data 8 of the L channel, the symbol 12 consists of 8 high order bits of the data 9 of the R channel, and the symbol 11 consists of four low order bits of the data 8 of the L channel and four low order bits of the data 9 of the R channel. By this bit conversion format, the conversion is attained with a simple circuit as will be explained later.

Figure 5:
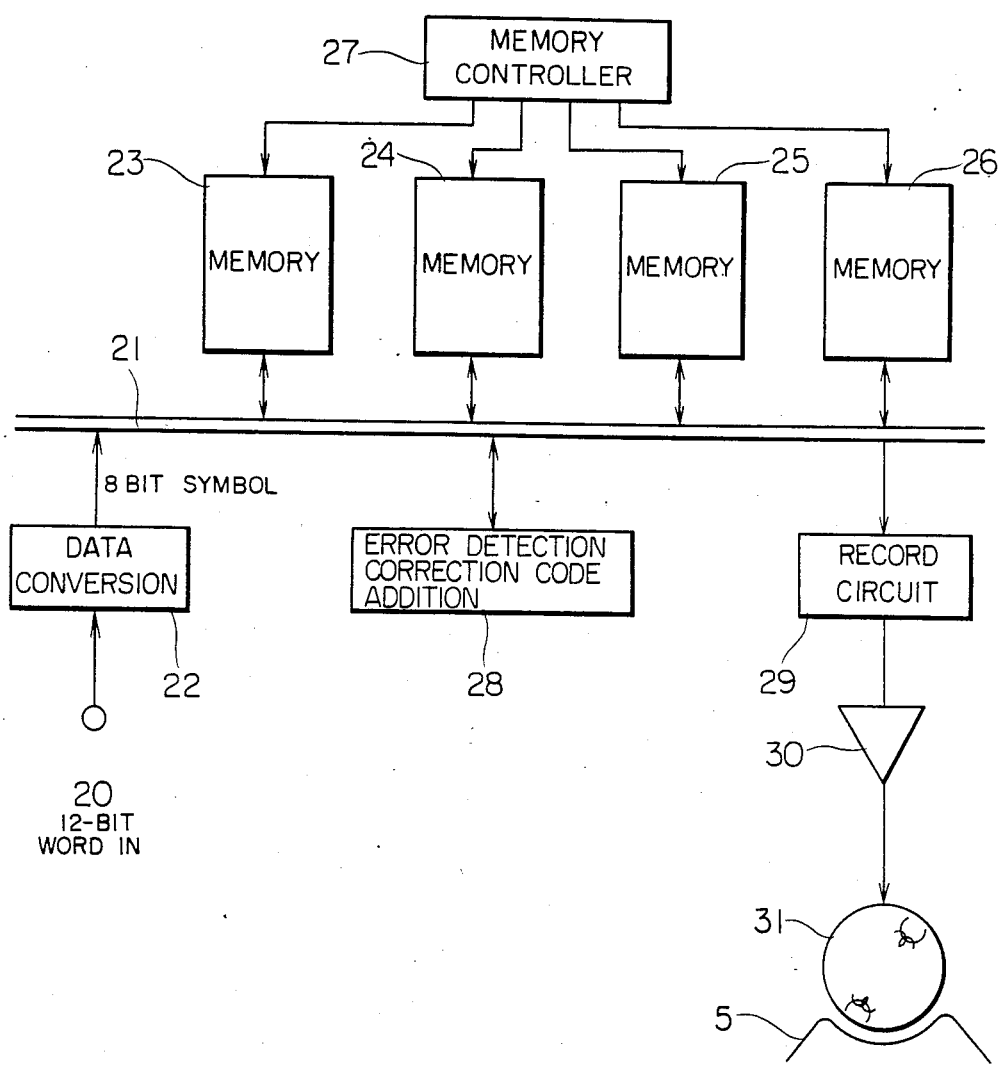
FIG. 5 shows a configuration of a PCM signal recording apparatus.

FIG. 5 shows a configuration of the PCM signal recording apparatus which records the PCM signal in accordance with the present invention. Numeral 20 denotes an input terminal to which the PCM signal is applied from a PCM signal source or a transmission line, numeral 21 denotes a data bus, numeral 22 denotes a data conversion circuit, numerals 23–26 denote memories, numeral 27 denotes a control circuit for the memories, numeral 28 denotes an error detection/correction code addition circuit, numeral 29 denotes a recording circuit, numeral 30 denotes an amplifier and numeral 31 denotes rotary heads.

The 12-bit PCM signal applied to the input terminal 20 is converted to the 8-bit data by the data conversion circuit 22 and the 8-bit data is stored in the memories 23–25 through the data bus 21. The PCM signals stored in the memories 23–26 are supplied to the error detection/correction code addition circuit 28 where they are interleaved and the first error detection/correction code 3 and the second error detection/correction code 4 are added. The interleaved PCM signal having the parity symbols added thereto is supplied to the recording circuit 29 block by block. In the recording circuit 29, a synchronization signal and sub-codes are added, and the signal is amplified by the amplifier 30 and recorded on the magnetic tape by the rotary heads 31.

The memories 23–26 each has one track of memory capacity. The memories 23 and 25 store the data shown in FIG. 1 and the memories 24 and 26 store the data shown in FIG. 2. Those memories may be one or two memories divided into four memory areas.

Figure 6:
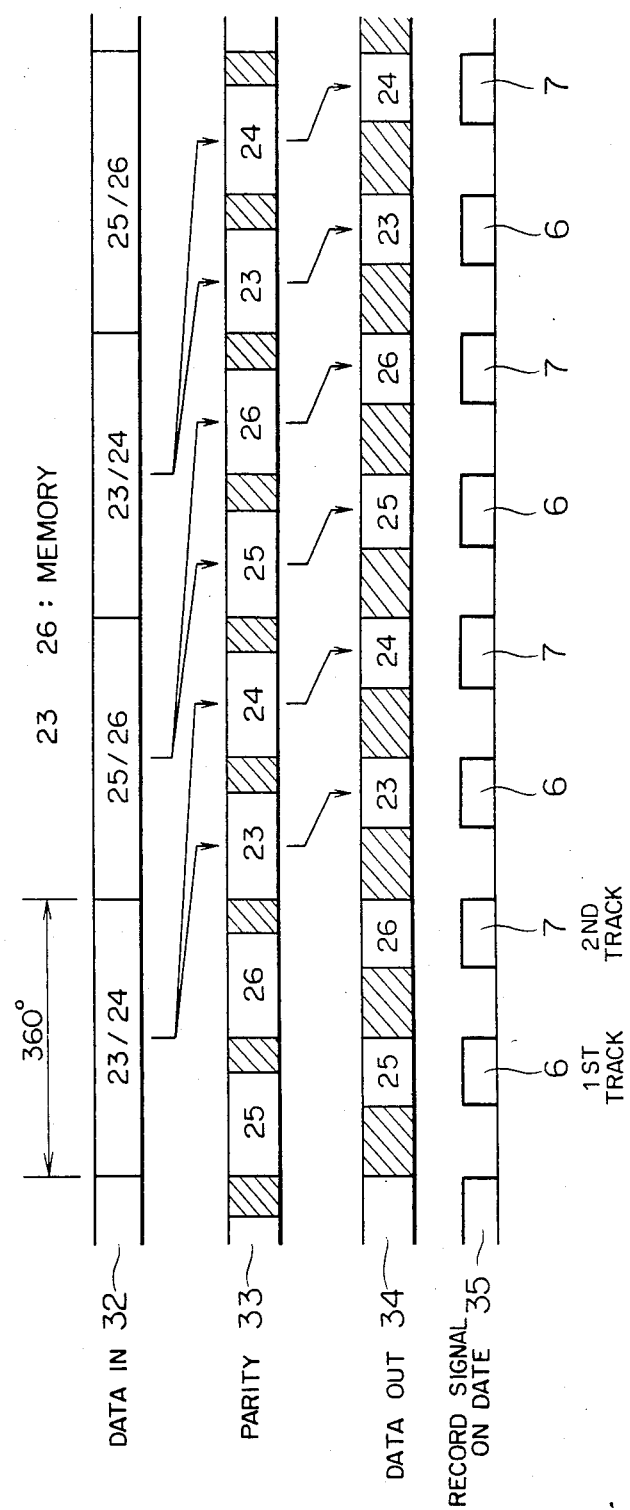
FIG. 6 illustrates an operation of a memory.

FIG. 6 illustrates the operation of the memories. Numeral 32 denotes input of data, numeral 33 denotes addition of error correction/detection code, numeral 34 denotes an output of data, and numeral 35 denotes a record signal to the magnetic tape. Numerals 23–26 inserted in the data/code series indicate the operating memories. The PCM signal outputted from the data conversion circuit 22 is stored in the memories 23 and 24 such that 1920 words of the data in the L channel and the R channel are stored in the memories 23 and 24, respectively, in one revolution (360°) of the rotary head 31. The addresses of the memories are controlled by the control circuit 27 so that the data is arranged as shown in FIGS. 1 and 2. The data stored in the memories 23 and 24 has the error detection/correction codes added thereto during the next revolution and the data is recorded on the magnetic tape 5. The PCM signal supplied while the data stored in the memories 23 and 24 is recorded is stored in the memories 25 and 26, and this data is recorded on the magnetic tape 5 during the next revolution.

Figure 7:
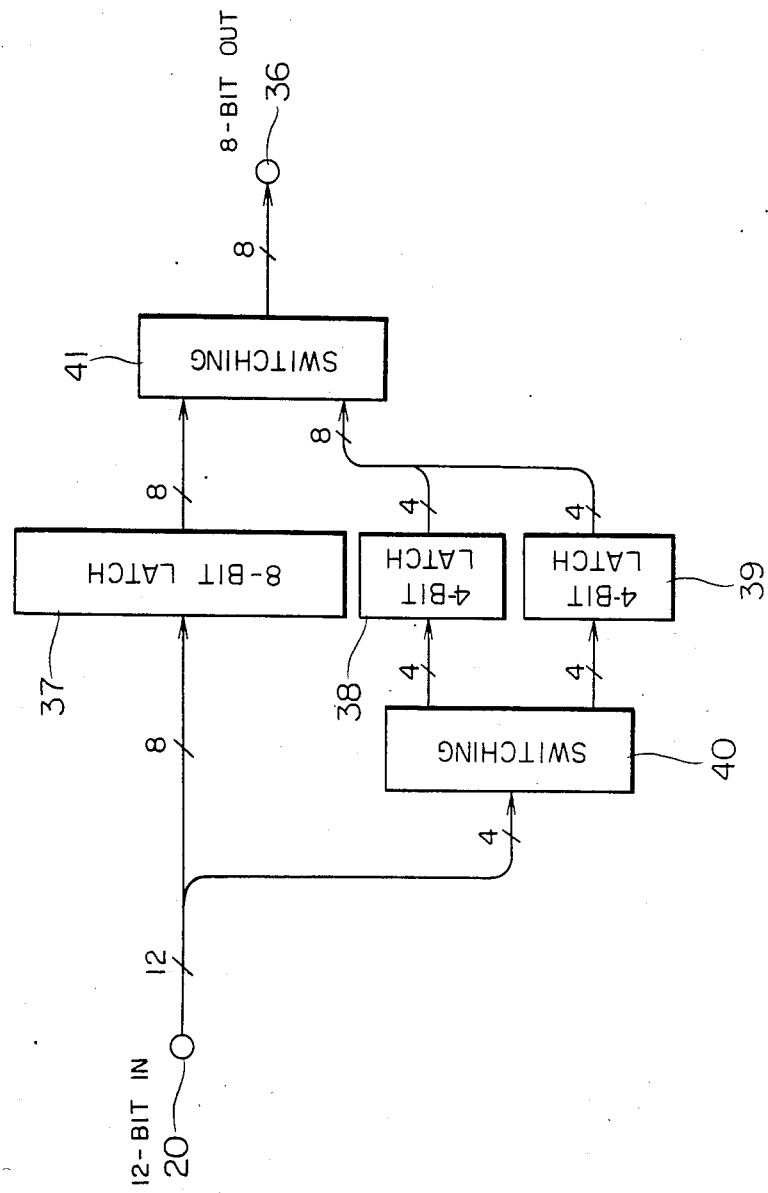
FIG. 7 shows a data conversion circuit.

FIG. 7 shows the data conversion circuit 22. It converts the 12-bit signal to the 8-bit signal. Numerals 37–39 denote latch circuits and numerals 40 and 41 denote switching circuits. The operation is explained with reference to a timing chart of FIG. 8.

The PCM signal supplied from the signal source and alternately arranged to the L and R channels by a multiplexor is supplied to the input terminal 20. The eight high order bits of the L channel PCM signal applied to the input terminal 20 is latched in the latch circuit 37, and four low order bits are latched in the latch circuit 38 through the switching circuit 40. The eight high order bits of the L channel latched in the latch circuit 37 is supplied to the output terminal 36 as the symbol 10. Then, the eight high order bits of the R channel PCM signal applied to the input terminal 20 is latched in the latch circuit 37, and the four low order bits are latched in the latch circuit 39 through the switching circuit 40. The eight-bit data latched in the latch circuits 38 and 39 is supplied to the output terminal 36 as the symbol 11. Finally, the eight high order bits of the R channel latched in the latch circuit 37 is supplied to the output terminal 36 as the symbol 12.

In accordance with the present embodiment, the 12-bit PCM signal can be converted to the 8-bit data with simple processing and the error concealment capability to the burst error is enhanced.

We claim;

1. A PCM signal recording method for converting PCM signals supplied from k channels and having m-bit words to data having n-bit words, where m and n are positive integers and m>n, and wherein km is an integral multiple of n, comprising the steps of:
   receiving k words of PCM signal, one word from each of k channels;
   delimiting n high order bits of each of k words of PCM signal to generate k data each consisting of n high order bits,
   generating k·(m−n) bits consisting of (m−n) low order bits of each of k words of PCM signal and dividing the k·(m−n) bits by n bits to generate k·(m−n)/n data; and
   recording the generated data having n-bits in units of record words on predetermined tracks.

2. A PCM signal recording method according to claim 1 wherein said m bits, n bit and k channels are 12 bits 8 bits and 2 channels, respectively, so that two words of input PCM signal are converted to three symbols of 8-bit data, the symbol data are formatted such that the record data terminates in first and second adjacent tracks of a predetermined length, and the 3-symbol data converted from the two words are arranged in neighbouring regions in the data block in the track.

3. A PCM signal recording method according to claim 2 wherein said tracks include a plurality of pairs of tracks formed by scanning a record medium by rotary-heads, the i words/channel of input PCM signal to be recorded on the track pairs are divided into first half and second half on the time sequence, the converted word data corresponding to the even data of the first half of the PCM signal and the converted word data corresponding to the odd data of the second half of the PCM signal constitute the data to be recorded on the first track of the pair of tracks, and the converted word data corresponding to the odd data of the first half of the PCM signal and the converted word data corresponding to the even data of the second half of the PCM signal constitute the data to be recorded on the second track of the pair of tracks.

4. A PCM signal recording method according to claim 3 wherein even or odd data are recorded in the first half of each track, and odd or even data are recorded on the second half of each track.

5. A signal recording method in a rotary-head type PCM signal recording apparatus comprising a plurality of recording heads, a rotary cylinder on which said heads are mounted, a signal input circuit coupled to a signal source to receive two channels of PCM signal having a first number of bits in each word, a conversion circuit for converting the PCM signal supplied from said signal input circuit to a symbol data having a second number of bits in each symbol, the second number being smaller than the first number, a signal processing circuit for adding an error detection/correction code and additional codes to the symbol data supplied from said conversion circuit, and a recording circuit for recording the output from said signal processing circuit to a plurality of track pairs on a recording tape, said method comprising steps of:
   (a) converting the two channels of PCM signal supplied from said signal source to a plurality of symbol data including symbols each consisting of the second number of high order bits of each word and a symbol having the second number of bits consisting of the remaining low order bits of both words;
   (b) storing said converting symbol data in units of two track data so that first symbol data corresponding to a first half of the two channels of input PCM signal and even data and second symbol data corresponding to a second half and odd data are arranged in a first track, and third symbol data corresponding to the second half and the even data, and second symbol data corresponding to the first half and the odd data are arranged in a second track;
   (c) generating an error detection/correction code for each track based on the stored symbol data in the track; and
   (d) supplying the error detection/correction code and the stored symbol data to said rotary heads to record them on a tape.

6. A signal recording method according to claim 5 wherein the set of said first and third data or the set of said second or fourth data is first recorded on said first and second tracks.

7. A rotary-head type PCM signal recording apparatus comprising:
   (a) a rotary cylinder having a plurality of recording heads and adapted to engage with a recording medium;
   (b) an input circuit coupled to a signal source to receive a plurality of channels of PCM signals each having a first number of bits in each word;
   (c) a data conversion circuit for converting channel PCM signals supplied from said input circuit to a plurality of symbols each consisting of a second number of bit, the second number being smaller than the first number;

said data conversion circuit generating the plurality of symbol data including symbols each consisting of the second number of high order bits of the PCM signals in the same time sequence and a symbol having the second number of bits consisting of the remaining low order bits of the PCM signal;

(d) a memory for storing the output of the data conversion circuit;

said memory having a capacity to store data of a plurality of tracks;

(e) a control circuit for controlling read/write of the memory to record the symbol data stored in the tracks of the recording medium;

said control circuit controlling so as to read out the stored symbol data by a data unit determined by a data quantity in a pair of first and second tracks and arrange the symbol data into first symbol data corresponding to a first half of the input channel PCM signal and even data, second symbol data corresponding to a second half and odd data, third symbol data corresponding to the second half and the even data and fourth symbol data corresponding to the first half and the odd data, and distribute the first and second symbol data to the first track and the third and fourth symbol data to the second track;

(f) an error detection/correction code addition circuit for adding an error detection/correction code to each of the set of the first and second symbol data and the set of the third and fourth symbol data; and (g) a recording circuit for supplying said first, second, third and fourth symbol data and said error detection/correction codes added thereto to respective rotary heads.

* * * * *